US 6,606,137 B2

(12) United States Patent
Lee

(10) Patent No.: US 6,606,137 B2
(45) Date of Patent: Aug. 12, 2003

(54) METHOD OF FABRICATING COLOR FILTER USING A SINGLE MASK HAVING PLURALITY OF PATTERNS, EACH HAVING DIFFERENT APERTURE RATIOS

(75) Inventor: Hyun Kyu Lee, Seoul (KR)

(73) Assignee: LG. Philips LCD, Co., Ltd, Seoul (KR)

( * ) Notice: Subject to any disclaimer, the term of this patent is extended or adjusted under 35 U.S.C. 154(b) by 15 days.

(21) Appl. No.: 09/749,453

(22) Filed: Dec. 28, 2000

(65) Prior Publication Data

US 2001/0051305 A1 Dec. 13, 2001

(30) Foreign Application Priority Data

Dec. 31, 1999 (KR) .......................................... P99-68076

(51) Int. Cl.[7] ..................... G02F 1/1335; G02F 1/1333; H01L 21/00
(52) U.S. Cl. ...................... 349/106; 349/107; 349/109; 349/110; 438/70
(58) Field of Search ................................. 349/106, 107, 349/109, 110, 187; 438/70

(56) References Cited

U.S. PATENT DOCUMENTS 5,101,279 A * 3/1992 Kurematsu et al. .......... 348/781
6,127,072 A * 10/2000 Shiba et al. ................. 349/106
6,248,482 B1 * 6/2001 Kashiwazaki et al. ..... 106/31.5

FOREIGN PATENT DOCUMENTS

JP         61-116301 A * 6/1986
JP      2000-258759 A * 9/2000

OTHER PUBLICATIONS

"Smart Materials", Dec. 27, 1998, The Week., Weekly news magazine of India.*

* cited by examiner

Primary Examiner—Tarifur R. Chowdhury
(74) Attorney, Agent, or Firm—McKenna Long & Aldridge

(57) ABSTRACT

A method of fabricating a color filter that is adaptive for reducing an exposure process of the color filter. In the method, a material layer for forming the color filter in which a color changes in accordance with an exposed light quantity is formed on a transparent substrate. Three primary color filters are formed by differentiating the amount of exposed light on the material layer.

20 Claims, 5 Drawing Sheets

26A

26B

26C

METHOD OF FABRICATING COLOR FILTER USING A SINGLE MASK HAVING PLURALITY OF PATTERNS, EACH HAVING DIFFERENT APERTURE RATIOS

This application claims the benefit of Korean Patent Application No. P99-68076, filed on Dec. 31, 1999, which is hereby incorporated by reference.

BACKGROUND OF THE INVENTION

1. Field of the Invention

The present invention relates to a liquid crystal display device, and more particularly, to a method of fabricating a color filter for a liquid crystal display device.

2. Discussion of the Related Art

Generally, a display device such as a liquid crystal display (LCD) divides light from a light source into three primary lights, red, green, and blue, to display a color picture. The display device has a color filter substrate provided with a plurality of red filters for transmitting only a red light, a plurality of green filters for transmitting only a green light and a plurality of blue filters for transmitting only a blue light for each pixel. The red, green and blue filters have to be manufactured such that they do not overlap each other to prevent picture deterioration and color blots.

As shown in FIG. 1A to FIG. 1E, a color filter substrate is made by sequentially forming a black matrix 4, a red filter 10, a green filter 12 and a blue filter 14 on a glass substrate 2. More specifically, as shown in FIG. 1A, the lattice-shaped black matrix 4 is formed on the glass substrate 2. The black matrix 4 is made by depositing an opaque material, such as chrome, on the glass substrate 2 and then patterning it. The black matrix divides the surface of the glass substrate 2 into a plurality of cell areas corresponding to the color filters, respectively, while preventing color interference between cell areas.

Next, as shown in FIG. 1B, a red resist 6 made from a polyimide or an acrylic resin dispersed with a red pigment is coated on the glass substrate 2 provided with the black matrix 4. Then, as shown in FIG. 1C and FIG. 1D, the red filter 10 is formed at a desired area by exposing the red resist 6 to an ultraviolet (UV) ray using a mask 8 patterned into a desired shape and thereafter developing and patterning the same.

As shown in FIG. 1E, the green filter 12 and the blue filter 14 are sequentially formed at the corresponding areas in a manner similar to the red filter 10.

However, the conventional color filter fabricating method has a problem in that, since the formation of the red, green and blue filters requires three photolithography steps, the fabrication process becomes long and complex. Also, a large amount of color resist is wasted in the etching process, resulting in an unnecessary cost. Another problem in the conventional color filter fabricating method is that the red, green, and blue filters are individually formed causing step coverage between the filters. Moreover, a cell gap difference results in a non-uniformed brightness.

SUMMARY OF THE INVENTION

Accordingly, the present invention is directed to a method of fabricating color filter that substantially obviates one or more of the problems due to limitations and disadvantages of the related art.

An advantage of the present invention is to provide a simplified method of fabricating a color filter for a liquid crystal display device using a single exposure process.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In order to achieve these and other advantages, and in accordance with the purpose of the present invention, as embodied and broadly described. A method of fabricating a color filter for a liquid crystal display comprises forming a black matrix on a substrate, substrate being divided into multiple areas; forming a light responsive material on the substrate and the black matrix, the light sensitive material being capable of changing color depending on an amount of light exposed onto the material; exposing light onto light responsive material corresponding to the multiple areas of the substrate, wherein the amount of light exposed is different for three areas of the substrate; and forming three color filters corresponding to the three areas, the three color filters having different colors.

In another aspect of the present invention, a method of fabricating a color filter includes forming a material layer for forming the color filter in which color changes in accordance with an amount of exposed light on a transparent substrate; and forming three primary color filters by differentiating the amount of light on the material layer.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiment of the present invention, example of which is illustrated in the accompanying drawings.

Figure 1A:
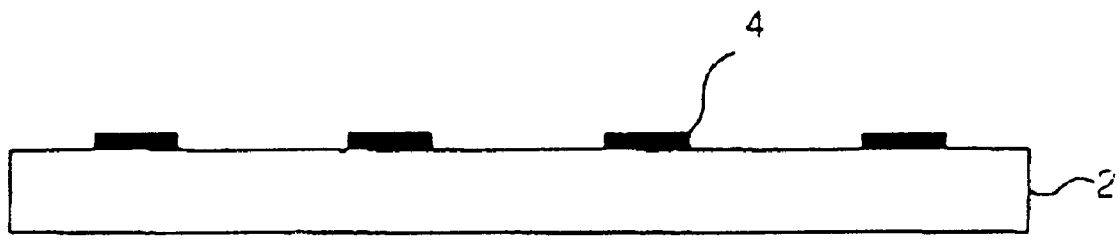
FIG. 1A to FIG. 1E are section views for explaining a conventional color filter fabricating method.
Figure 1B:
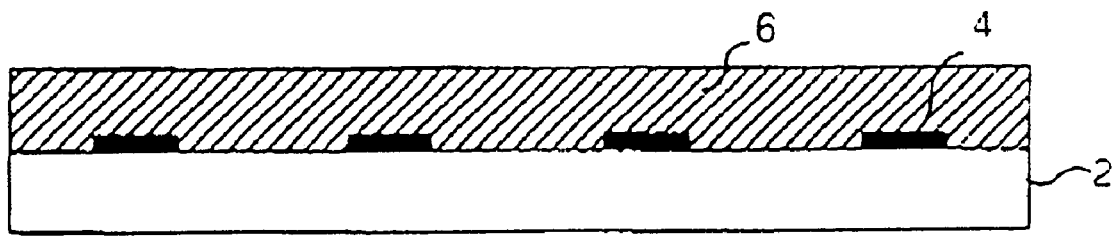
Figure 1C:
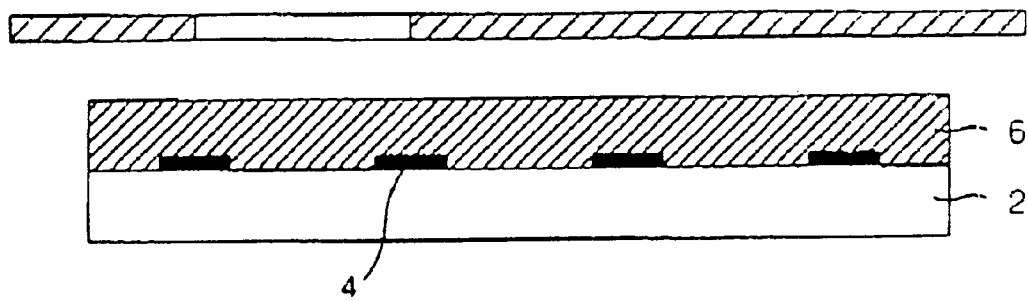
Figure 1D:
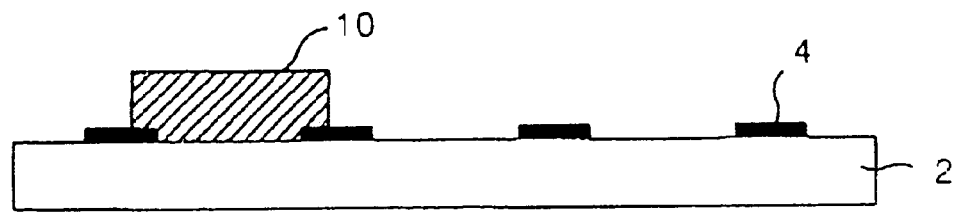
Figure 1E:
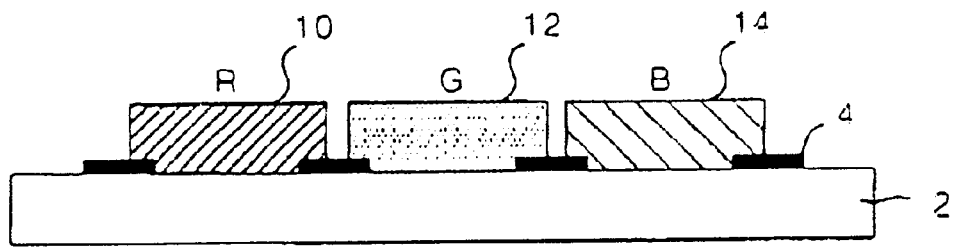
Figure 2A:
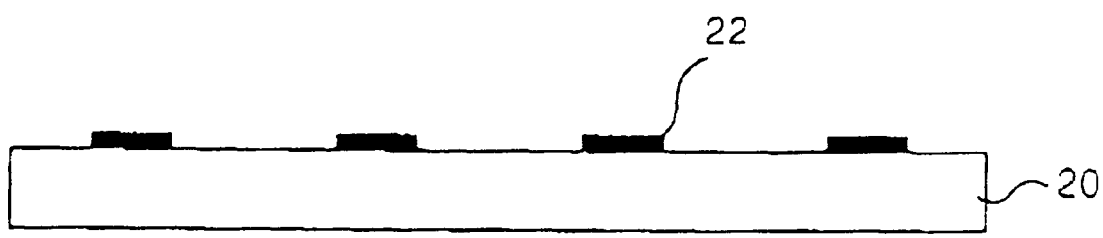
FIG. 2A to FIG. 2D are section views for explaining a color filter fabricating method according to an embodiment of the present invention.

FIG. 2A to FIG. 2D are section views for explaining a color filter fabricating method according to an embodiment of the present invention. First, as shown in FIG. 2A, a lattice-shaped black matrix 22 is formed on a glass substrate 20. The black matrix 22 is made by depositing an opaque material, such as chrome, on the glass substrate 20 and then patterning it. The black matrix 22 divides the surface of the glass substrate 20 into a plurality of cell areas to be provided with the color filters and prevents color interference between these cell areas.

Figure 2B:
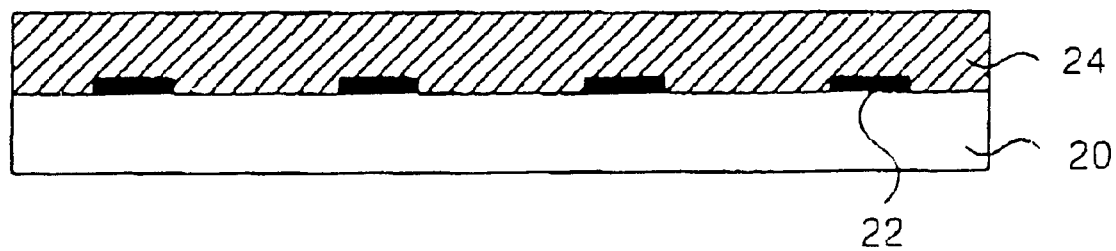

Next, as shown in FIG. 2B, a material in which color changes in accordance with light energy, such as a cholesteric liquid crystal film 24, is deposited on the glass substrate 20 provided with the black matrix 22.

Figure 2C:
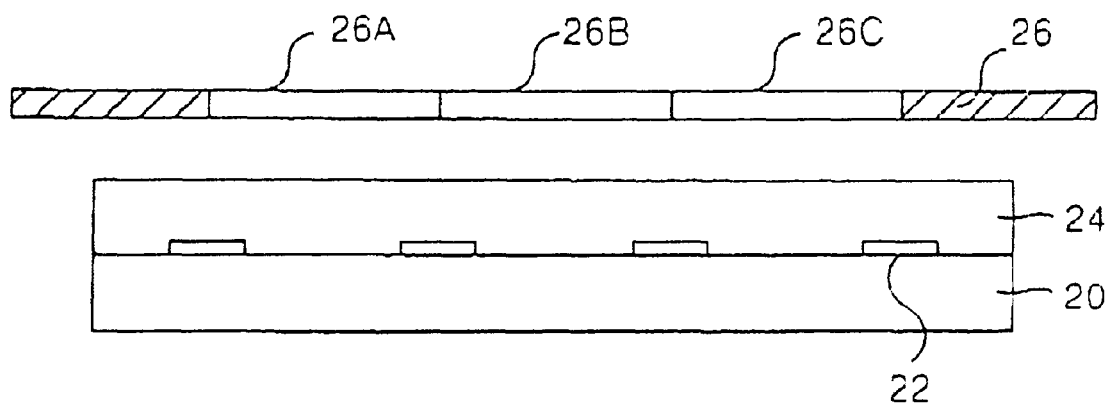
Figure 3:
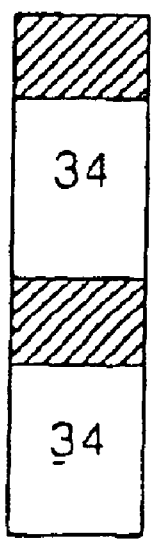
FIG. 3 shows plan views of examples of the mask in FIG. 2C.
Figure 3:
Figure 3:
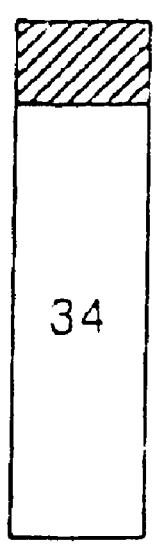

As shown in FIGS. 2C and 3, the cholesteric liquid crystal film 24 is exposed by means of a mask 26 including first, second, and third patterns 26A, 26B, and 26C formed with different aperture ratios. In this case, the first, second, and third patterns 26A, 26B, and 26C of mask 26 is provided with different sizes of apertures 34 to differentiate light transmissivity. For instance, the apertures 34 are formed such that the first pattern 26A for forming a red filter has an aperture ratio of 33%, the second pattern 26B for forming a green filter has an aperture ratio of 50%, the third pattern 26C has an aperture ratio of 70%.

Figure 2D:
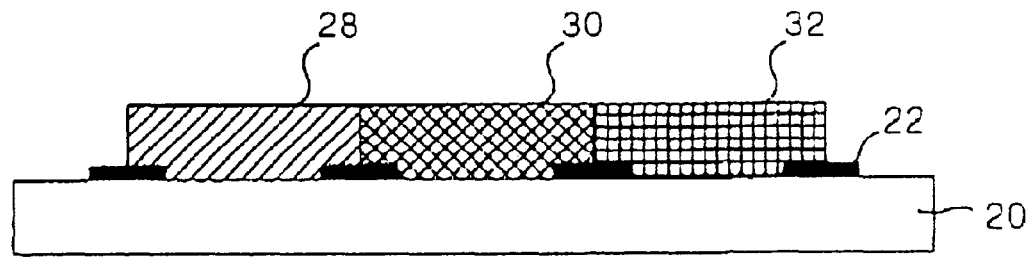

Consequently, light having different energy is irradiated onto the subject areas of the cholesteric liquid crystal film 24 corresponding to the first, second, and third patterns 26A, 26B, and 26C to form red, green and blue color filters 28, 30, and 32, as shown in FIG. 2D. In this case, a color mixture or overlap is prevented at adjacent portions between the color filters 28, 30, and 32. To more reliably prevent color mixture, a gap can be provided between the first, second, and third patterns 26A, 26B, and 26C.

As a result, since the color filter fabricating method of the present invention controls light transmissivity using a material in which color changes in accordance with an amount of exposed light, three primary color filters can be formed by a single coating and exposure process.

As described above, according to the present invention, a material in which color changes in accordance with an amount of light to form color filters by a single coating and exposure process, simplifies the color filter fabricating process. Also, such material is not wasted in the etching process to reduce manufacturing cost. In addition, a material for the color filter formation is coated once to eliminate step coverage between the color filters. Thus, it becomes possible to prevent cell gap differences.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of fabricating a color filter for a liquid crystal display comprising:
    forming a black matrix on a substrate, the substrate being divided into multiple areas;
    forming a light responsive material on to substrata and the black matrix, the light responsive material being capable of changing color depending on an amount of light exposed onto the material;
    exposing light onto the light responsive material corresponding to the multiple areas of the substrate, wherein the amount of light exposed is different for three areas of the substrate, and wherein a single exposure is performed using a single mask having a plurality of patterns, each having different aperture ratios; and
    forming three color filters corresponding to the three areas, the three color filters having different colors.

2. The method according to claim 1, wherein the amount of light is controlled to be exposed enough to form a red color filter, green color filter and a blue color filter.

3. The method according to claim 1, wherein a mask is used to pass a first amount of light onto a first one of the three areas, a second amount of light onto a second one of the three areas and a third amount of light onto a third one of the three areas.

4. The method according to claim 3, wherein the first amount corresponds to red color, the second amount corresponds to green color and the third amount corresponds to blue color.

5. The method according to claim 3, wherein the mask has first, second and third patterns.

6. The method according to claim 5, wherein the first pattern has an aperture ratio of about 33%, the second pattern has an aperture ratio of about 50% and the third pattern has an aperture ratio of about 70%.

7. The method according to claim 5, wherein the first pattern of the mask having two transparent parts, the second pattern of the mask having one transparent part and the third pattern of the mask having one transparent part.

8. The method according to claim 7, wherein the two transparent parts of the first pattern of the mask are substantially the same in area.

9. The method according to claim 7, wherein the third pattern of the mask is mostly transparent.

10. The method according to claim 7, wherein the one transparent part of the second pattern of the mask is smaller in area than the one transparent part of the third pattern of the mask.

11. The method according to claim 5, wherein the first pattern is spaced from the second pattern, and the second pattern is spaced from the third pattern.

12. The method according to claim 1, wherein the light responsive material includes cholesteric liquid crystal.

13. A method of fabricating a color filter comprising:
    forming a layer of material on a substrate, the material being capable of changing to a color in accordance with an amount of light exposed; and
    forming three color filters by simultaneously exposing different amounts of light on different areas of the material, and wherein a single exposure is performed using a single mask having a plurality of patterns, each having different aperture ratios.

14. The method according to claim 13, wherein the material changes to red, green and blue in response to the different amounts of light.

15. The method according to claim 13, wherein forming the color filters includes exposing the material to light through a mask having first, second and third patterns having different aperture ratios.

16. The method according to claim 15, wherein the first pattern is spaced from the second pattern, and the second pattern is spaced from the third pattern.

17. The method according to claim 15, wherein the first pattern has an aperture ratio of about 33%, the second pattern has an aperture ratio of about 50% and the third pattern has an aperture ratio of about 70%.

18. The method according to claim 15, wherein the first pattern of the mask having two transparent parts, the second pattern of the mask having one transparent part and the third pattern of the mask having one transparent part.

19. The method according to claim 13, further comprising forming a black matrix on the substrate.

20. The method according to claim 13, wherein the material for forming the color filters includes cholesteric liquid crystal.

* * * * *